United States Patent [19]
Freiman

[11] Patent Number: 6,020,722
[45] Date of Patent: Feb. 1, 2000

[54] TEMPERATURE COMPENSATED VOLTAGE LIMITED FAST CHARGE OF NICKEL CADMIUM AND NICKEL METAL HYBRIDE BATTERY PACKS

[75] Inventor: Joseph F. Freiman, Cypress, Tex.

[73] Assignee: Compaq Computer Corporation, Houston, Tex.

[21] Appl. No.: 08/885,277

[22] Filed: Jun. 30, 1997

[51] Int. Cl.[7] .................................................... H02J 7/00
[52] U.S. Cl. ......................... 320/164; 320/162; 320/134
[58] Field of Search ................................... 320/150, 160, 320/162, 163, 164, 134; 324/431, 433

[56] References Cited

U.S. PATENT DOCUMENTS

| | | |
|---|---|---|
| 3,906,329 | 9/1975 | Bader ...................................... 320/134 |
| 3,944,904 | 3/1976 | Hase . |
| 4,354,148 | 10/1982 | Tada et al. . |
| 5,084,664 | 1/1992 | Gali . |
| 5,289,101 | 2/1994 | Furuta et al. . |
| 5,296,797 | 3/1994 | Barlett . |
| 5,307,000 | 4/1994 | Podrazhansky et al. . |
| 5,367,244 | 11/1994 | Rose . |
| 5,376,875 | 12/1994 | Yee et al. . |
| 5,408,170 | 4/1995 | Umetsu et al. . |
| 5,412,306 | 5/1995 | Meadows et al. . |
| 5,422,559 | 6/1995 | Hall et al. . |
| 5,440,221 | 8/1995 | Landau et al. . |
| 5,442,274 | 8/1995 | Tamai . |
| 5,481,174 | 1/1996 | Martin et al. . |
| 5,523,671 | 6/1996 | Stewart . |
| 5,541,491 | 7/1996 | Yamazaki et al. . |
| 5,598,085 | 1/1997 | Hasler . |
| 5,614,805 | 3/1997 | Momotani et al. . |
| 5,617,007 | 4/1997 | Keidl et al. . |
| 5,721,481 | 2/1998 | Narita et al. ............................ 320/111 |

OTHER PUBLICATIONS

"Battery–Management Circuitry Gets Smarter", Sr.Editor, Computer Design's OEM Integration, May 1994, pp. 15–18.

M.Fetcenko et al., "Advantages of Ovonic Alloy System for Portable and EV NI–MH Batteries".

V.A.Ettel "Advanced Nickel Electrode Structures and Battery Research at INCO".

N.Marincic et al., "Warm Rechargeable Lithium Polymer Batteries For Downhole Applicat Application", 1997, 14th Int'l Seminar on Primary & Secondary Batteries.

Benchmarq application, "Using the Bq2003 to Control Fast Charge", Nov. 1994.

Benchmarq, "Using NiMH and Li–Ion Batteries in Portable Applications", Apr. 1996.

Sanyo Data Sheet SF–9470ND, "Rechargeable Battery Charging System", 1996.

Dallas Semiconductor Data Sheet, "DS1633 High–Speed Battery Recharger",052694, 1995.

Maxim Data Sheet, "MAX1259 Battery Manager", 19–4638, Apr. 1994.

Benchmarq Data Sheet, "Bq2002 Fast Charge IC", Sep. 1996.

Benchmarq Data Sheet, "Bq2005 Dual–Battery Fast Charge IC", Sep. 1996.

Benchmarq Data Sheet, "Bq2014 Gas Gauge IC with External Charge Control", Dec. 1995.

Benchmarq Data Sheet, "Bq2053X Lithium Ion Pack Supervisor", Sep. 1996.

Hooper et al., "Pulse Discharge Characteristics of Solid–State Lithium Batteries" Journal of Power Sources, 27, pp. 3–13, 1989.

*Primary Examiner*—Peter S. Wong
*Assistant Examiner*—Gregory J. Toatley, Jr.
*Attorney, Agent, or Firm*—Robert Groover

[57] ABSTRACT

A method for charging nickel metal hydride and comparable batteries, in which the applied voltage is clamped to a temperature-dependent and current-dependent value which is greater than the constant voltage during most of the charging cycle, but less than any voltage at which gassing can occur.

18 Claims, 5 Drawing Sheets

TEMPERATURE COMPENSATED VOLTAGE LIMITED FAST CHARGE OF NICKEL CADMIUM AND NICKEL METAL HYBRIDE BATTERY PACKS

BACKGROUND AND SUMMARY OF THE INVENTION

The present invention relates to circuitry for charging nickel metal hydride (NiMH) and nickel cadmium (Ni—Cd) batteries.

Nickel metal hydride batteries are now a fairly mature battery technology, and continue to provide competitive amounts of power storage per unit volume. (Lithium-ion batteries provide superior power storage for unit weight, but are substantially more expensive than nickel metal hydride batteries.) See generally Linden, HANDBOOK OF BATTERIES (2.ed. 1995), which is hereby incorporated by reference.

Traditionally, NiCd or NiMH batteries are charged at a constant current or a constant power approximately equivalent to their "C rate". (The "C rate" is the current which would theoretically fill the battery's capacity in one hour. Thus, for a 1.7 Ampere-hour battery the C rate is 1.7 Amperes.)

When a discharged battery is recharged, it initially converts the active material in the electrodes to a higher valence state and thus stores energy chemically. When all of the active material is converted and the battery voltage increases, a secondary oxygen generating chemical reaction occurs. This oxygen which is generated from the positive electrode migrates to the negative electrode where it reacts to form water and heat. This is called an overcharge reaction.

The rate at which oxygen is generated is proportional to the current passing through the battery, and the rate at which the oxygen is recombined at the negative electrode is a function of cell design. It is important to throttle back the current when the battery reaches the overcharge (oxygen generating) condition, since otherwise excessive gas pressure within the cells can cause them to activate their safety vents (~100 psi). This results in loss of electrolyte and premature failure of the cell.

The traditional methods of terminating fast charge currents and throttling back to the acceptable C/10 or less maintenance currents were:

1.) By sensing the temperature rise of the battery and reducing charge current when the battery reached 40–45° C., or
2.) By sensing the battery voltage reduction from its peak voltage (-dV) equivalent to about 10–20 mV per cell for a given battery pack. This is ultimately related to the rise of battery pack temperature, since it is the self heating of the battery pack which causes the battery pack voltage to fall.

Thus both of these methods rely on heating within the battery. However, heating within the battery is inherently undesirable. By the time the cell surface temperature reaches 45° C., a significant build up of heat within the battery is causing degradation of internal components, such as the separator. Also, the cell temperature lags behind the internal pressure increase and could result in the cell venting before the cutoff temperature is reached. This is likely when charging a battery at the low end of its temperature specification.

Moreover, the oxygen generated during the overcharge reactions cause an oxidizing atmosphere in the interior of the cells. This too can degrade the internal components of some battery cells.

Prior art FIG. 1 shows typical curves for voltage, temperature, and current during conventional charging of a NiMH battery. After the voltage has initially risen to a stable value $V_1$ (in the neighborhood of 1.2 volts per cell, in this example) at time $t_1$, the voltage stays fairly constant (although unregulated), until it begins to rise again, towards the end of the charging cycle, at time $t_2$. At about this time (if the charging is being performed under constant-power conditions) the current through the battery begins to decrease at a faster rate than previously. At a time shown as $t_3$, the voltage reaches its maximum $V_{max}$ (around 1.5 volts per cell, in this example), and thereafter declines. Either the decline in voltage after time $t_3$, or the rise in voltage after time $t_2$, is typically used to detect the end of charge. However, as the third curve in FIG. 1 shows, the temperature increases dramatically from time $t_2$ on. Thus, this conventional way of detecting completion of nickel metal hydride charging imposes a substantial thermal load on the system, and may also be difficult to implement optimally where a battery is disconnected and reconnected to the charging circuit frequently.

FIG. 1 shows charging under constant power conditions, but similar voltage and temperature behavior would appear under constant current conditions.

Fast Charging Method

The present application teaches a new method for charging nickel metal hydride and comparable batteries. As shown in FIG. 2, the applied voltage is clamped to a value which is regulated, in a temperature-dependent way, to always be less than the gassing voltage for the particular conditions being experienced by the cell. Thus the endpoint must be detected in some other way, or the battery can simply be allowed to stabilize at this clamped voltage. Since gassing does not occur, nor the massive rise in temperature used in previous methods, detection of the end of charging stage is not critical.

Thus the internal pressure and temperature increase is minimized by reducing the generation of oxygen in the cells during overcharge. When the battery voltage increases to the clamped value, the current falls off to a low value that produces very little oxygen and therefore very little heat. The oxygen that is produced is recombined quickly and therefore causes little pressure build up within the cell. Since the battery voltage is inversely proportional to temperature, this clamping voltage is temperature compensated. Tests have confirmed that this method of clamping the charge voltage results in a minimal rise in battery temperature while inputting a full charge.

Some of the advantages of this method are:

Minimal gas generation which results in minimum internal pressure and minimum heat generation. This will reduce the likelihood of a cell venting, and the lower operating temperature will prolong the service life of the battery.

Reduced exposure of the cell internals to oxidizing conditions. Thus this method of fast charge termination should be particularly advantageous for NiMH c ells whose components are very sensitive to oxidation at elevated temperatures.

Cells can be charged at a fast rate (approximately 1C), during only the portion of the charge cycle when they can accept it.

Temperature rise during charging is minimized In particular, temperature rise under over-charging conditions is minimized.

Cells can be fully charged within 60–90 minutes without adverse temperature rise.

The charging process is self regulating (regardless of power available), though may have to monitor ambient temperature.

This invention provides a method of fast charging (in about one hour) a sealed nickel cadmium (NiCd) or a sealed nickel metal hydride (NiMH) battery in a way which minimizes the heat generated by the battery and which is less abusive to the battery and should result in a longer battery service life.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
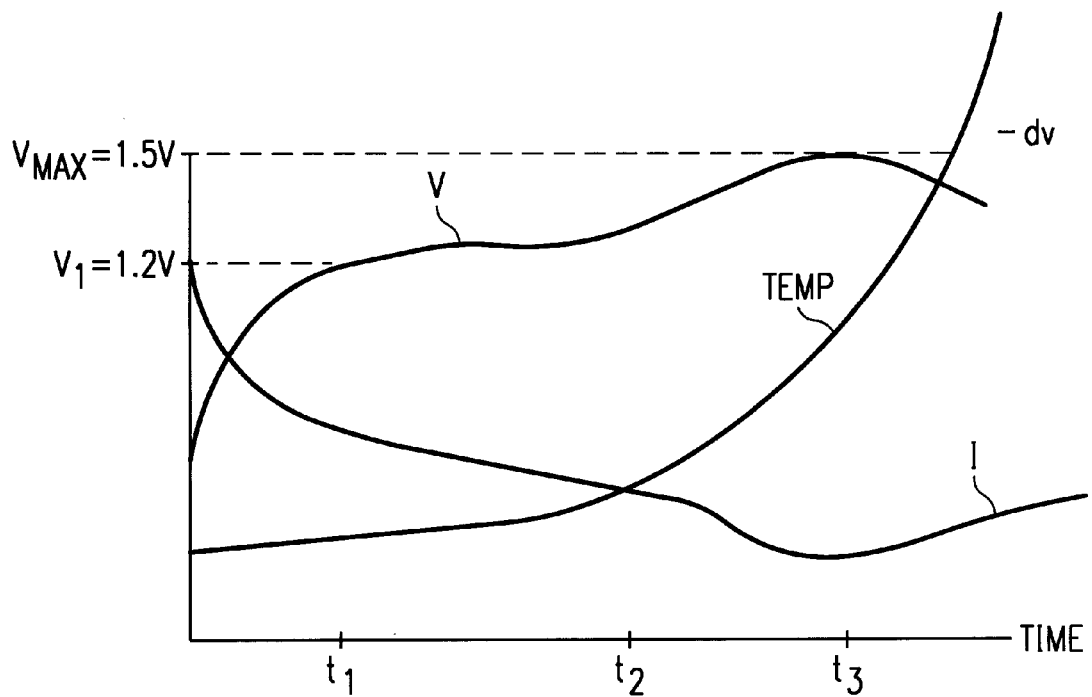
FIG. 1 shows typical curves for voltage, temperature, and current during conventional charging of a NiMH battery.
Figure 2:
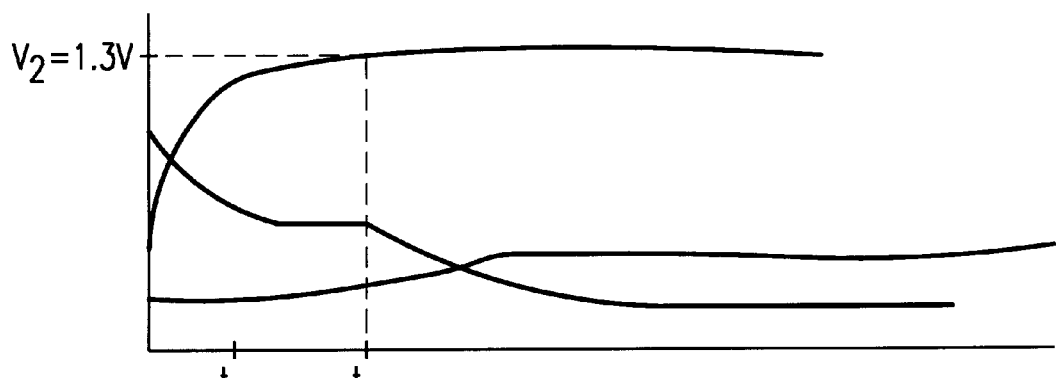
FIG. 2 schematically shows typical curves for voltage, temperature, and current during charging of a NiMH battery according to the disclosed inventions.

The numerous innovative teachings of the present application will be described with particular reference to the presently preferred embodiment (by way of example, and not of limitation), in which:

FIG. 2 schematically shows a plot of voltage, temperature, and current over time, during charging of a NiMH battery according to a sample embodiment of the invention. Initially the battery is charged under current-limited or power conditions, and the voltage is allowed to rise to a stable value $V_1$ (in the neighborhood of 1.2 volts per cell, in this example) at time $t_1$. Up to this point the method is similar to that of FIG. 1. However, when the voltage starts to rise above $V_1$, it is clamped at a value $V_2$ which is slightly higher than $V_1$ (although well below the voltage $V_{max}$ reached in FIG. 1). (In this example, where V1 is about 1.2V per cell and $V_{max}$ is about 1.5V per cell at 1C charging rate and room temperature ambient, V2 is about 1.3V per cell.)

Once the voltage reaches this value V2, the current falls off dramatically. V2 is chosen to be below the gassing voltage, so the current that does flow produces very little oxygen and therefore very little heat. Any oxygen that is produced is recombined quickly, and therefore causes little pressure build up within the cell.

Voltage V1 is dependent on temperature. See, e.g., Linden's FIG. 33.15(a). Therefore the clamping voltage V2 must also be made dependent on temperature. Since the battery voltage is inversely proportional to temperature, this clamping voltage is temperature compensated.

The clamping voltage is preferably measured empirically, as a function of temperature (and possibly charge rate), for each particular cell type. Since the voltage control is preferably performed by a microcontroller which is integrated in the battery pack, the microcontroller is simply programmed at the time of manufacture to match the battery it is integrated with. Separate measurement of individual cell voltages is not required, though of course it can be used if desired.

Figure 3:
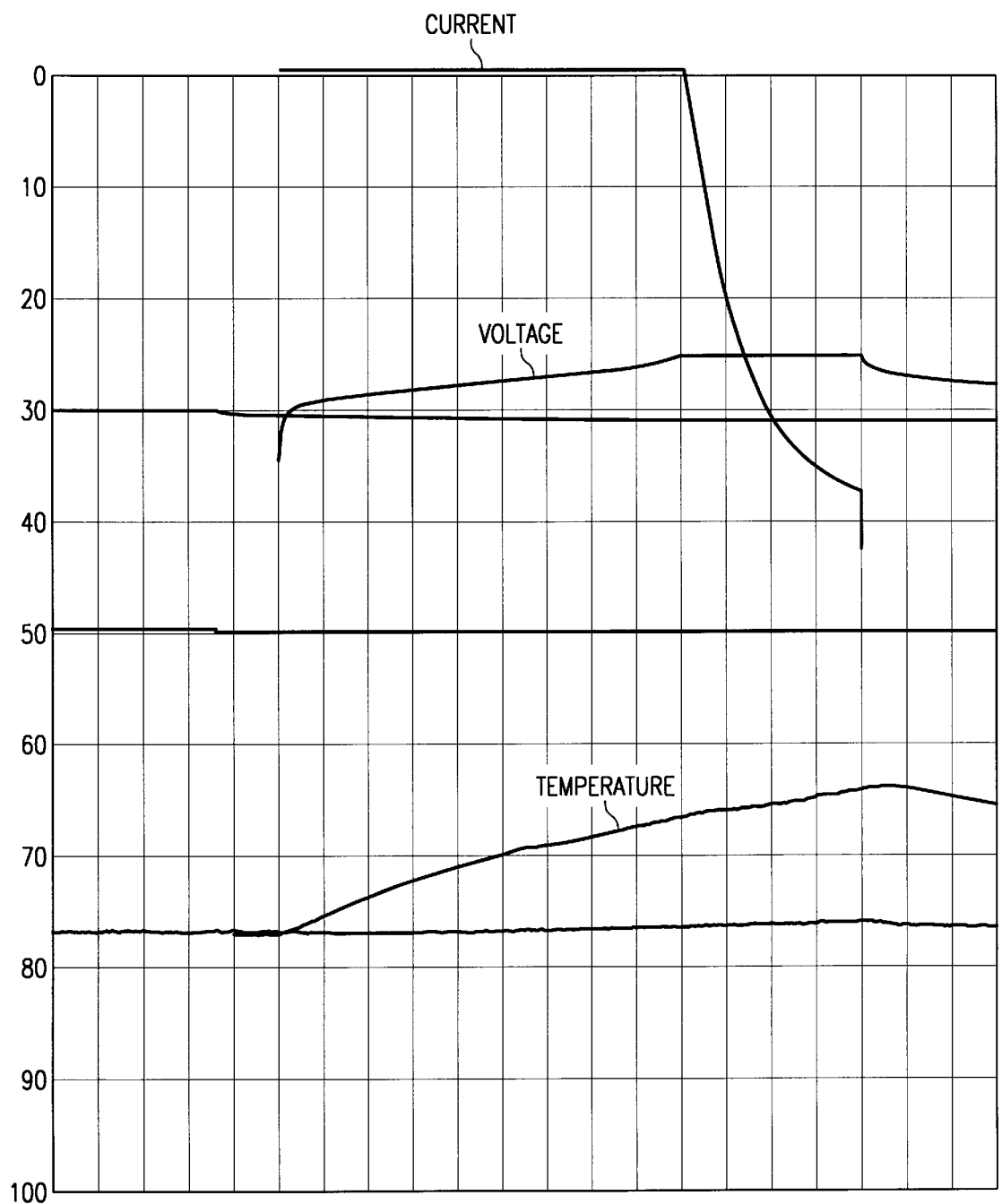
FIG. 3 shows actual curves for voltage, temperature, and current during charging of a NiMH battery according to a sample embodiment.

Tests have confirmed that this method of clamping the charge voltage results in a minimal rise in battery temperature while inputting a full charge. FIG. 3 shows actual curves for voltage, temperature, and current during charging of a NiMH battery according to a sample embodiment. In this example, a 10-HR2200 NiMH battery pack was used. It was found that 100% of nominal capacity was successfully put into the pack in 60 minutes when Vmax=15V, Imax=2.5A. The temperature rose from 23° C. to 33.5° C. in 45 minutes before current folded back. An additional 2° C. rise (to a maximum temperature of about 35° C.) occurred during the next 15 minutes.

Figure 4:
FIG. 4 shows actual curves for voltage, temperature, and current during charging of a NiCd battery according to a sample embodiment of the disclosed inventions.

FIG. 4 shows actual curves for voltage, temperature, and current during charging of a NiCd battery according to a sample embodiment of the disclosed inventions. In this example, using a 10-cell pack of KR1700 NiCds, it appears that about 95% of nominal capacity can be put into the pack in 60 minutes by setting the voltage limit to 15.0 V and by setting the current limit to 2.5A. The peak temperature rose only from 23° C. to 24° C. during this time. (The time axis of this figure is 5 minutes per division.)

Figure 6:
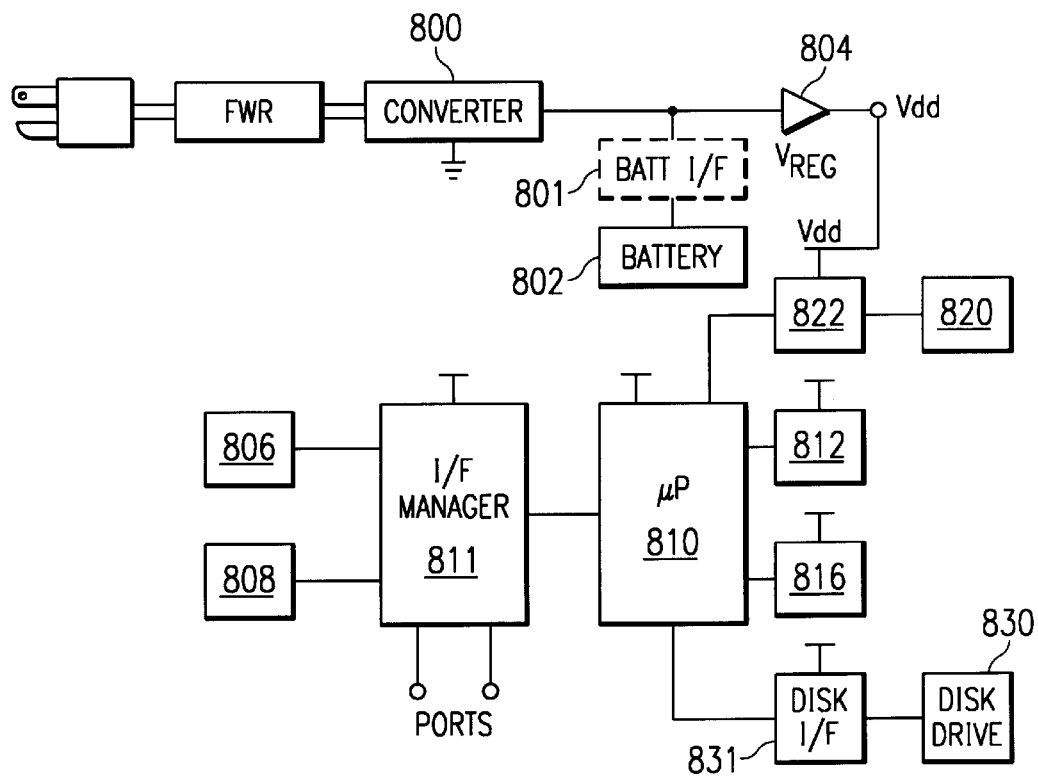
FIG. 6 schematically shows a sample computer system architecture which includes a battery charger which uses the disclosed charging method.

FIG. 6 schematically shows a sample computer system architecture which can be charged by the disclosed method. This system shows a portable computer including a power converter 800 which is used to charge the battery 802. Optionally, a battery interface 801 is interposed between the battery and the rest of the circuitry. The power converter is connected, through a full-wave bridge rectifier FWR, to draw power from AC mains, and is connected to provide a DC voltage to the battery. The battery 802 (or the converter 800), connected through a voltage regulator 804, is able to power the complete portable computer system, which includes. in this example:

user input devices (e.g. keyboard 806 and mouse 808);
 at least one microprocessor 810 which is operatively connected to receive inputs from said input device, through an interface manager chip 811 (which also provides an interface to the various ports);
 a memory (e.g. flash memory 812 and RAM 816), which is accessible by the microprocessor;
 a data output device (e.g. display 820 and display driver card 822) which is connected to output data generated by microprocessor; and
 a magnetic disk drive 830 which is read-write accessible, through an interface unit 831, by the microprocessor.

Optionally, of course, many other components can be included, and this configuration is not definitive by any means.

Figure 7:
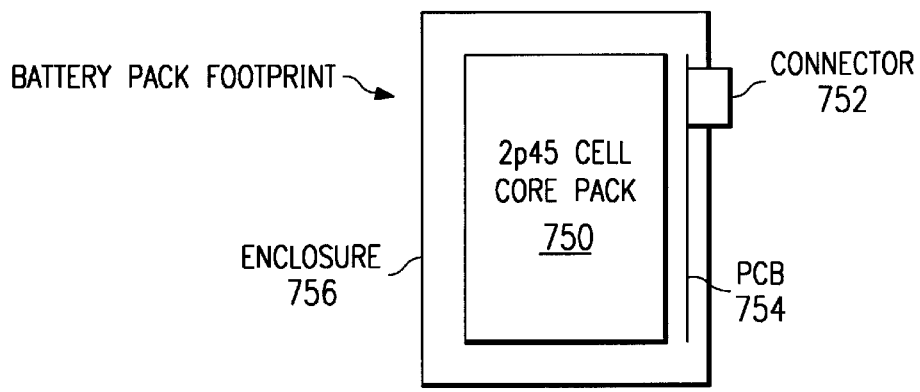
FIG. 7 shows the physical configuration of a smart battery pack which can be charged by the disclosed method.

FIG. 7 shows the physical configuration of a smart battery pack which may be charged by the disclosed method. A group of battery cells 750 is connected to a printed circuit board (PCB) 754, which is connected to an external connector 752. The group of battery cells 750, in this sample embodiment, is made of a welded-together group of cylindrical cells (18 mm diameter and 65 mm high) connected in a 2P4S configuration (i.e. with four pairs of cells connected in series), but of course a prismatic cell or other cell configurations can be used instead. The board 754 and the cells 750 are protected by enclosure 756, which can be a rigid plastic case or a skin of tough plastic.

Figure 8:
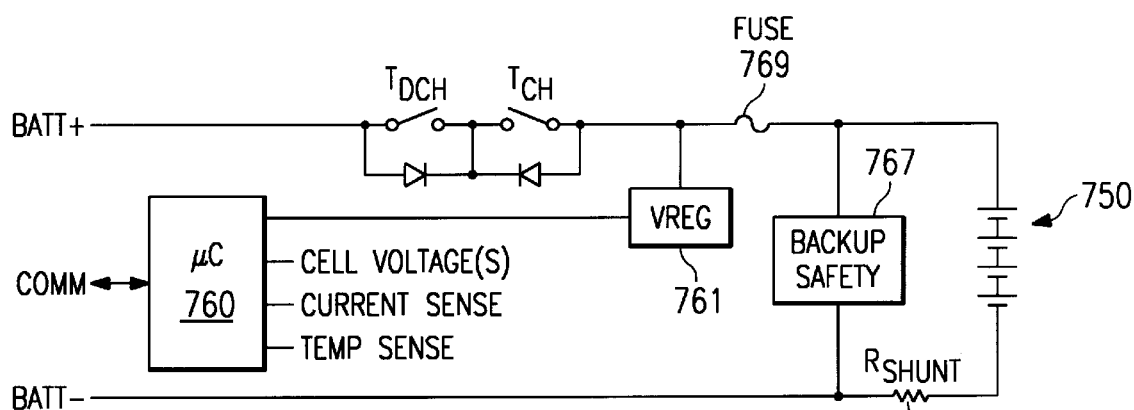
FIG. 8 generally shows the electrical configuration of the smart battery pack of FIG. 7.

FIG. 8 generally shows the electrical configuration of the smart battery pack. A microcontroller 760 receives various sense inputs, including e.g. battery cell voltage, a temperature sensing input, and a current sensing input (derived from the shunt resistor 763 on the negative side of the cells 750). If more sense inputs are needed, a multiplexer is optionally used to conserve the available ports of the microcontroller. (For example, with a lithium-ion battery it is preferably to monitor the voltage of each cell in a series combination.) The shunt resistor is preferably very small, e.g. about 50 milliohms. The microcontroller 760 also provides communication with host, preferably through a serial bus such as an $I^2C$ bus. A stable power supply for the microcontroller 760 (and other control circuitry) is provided by a small regulator 761. A charging transistor $T_{CH}$ cuts off charging current when it is turned off, and a discharging transistor $T_{OCH}$ cuts off discharging current when it is turned off. (Note that the built-in diodes of these two transistors are opposed.) Thus the connector 752 includes not only the current-carrying terminals BATT+ and BATT−, but also the lines for the serial communication bus. This connector can also include connections which allow the microcontroller 760 to discern which bay (of a multi-bay system) the smart battery pack is in, and whether it is currently the active battery pack. A conventional backup safety circuit 767 also monitors total battery voltage, and will blow the fuse 769 if for some reason the microcontroller 760 fails to correct an overcharging situation.

Figure 5:
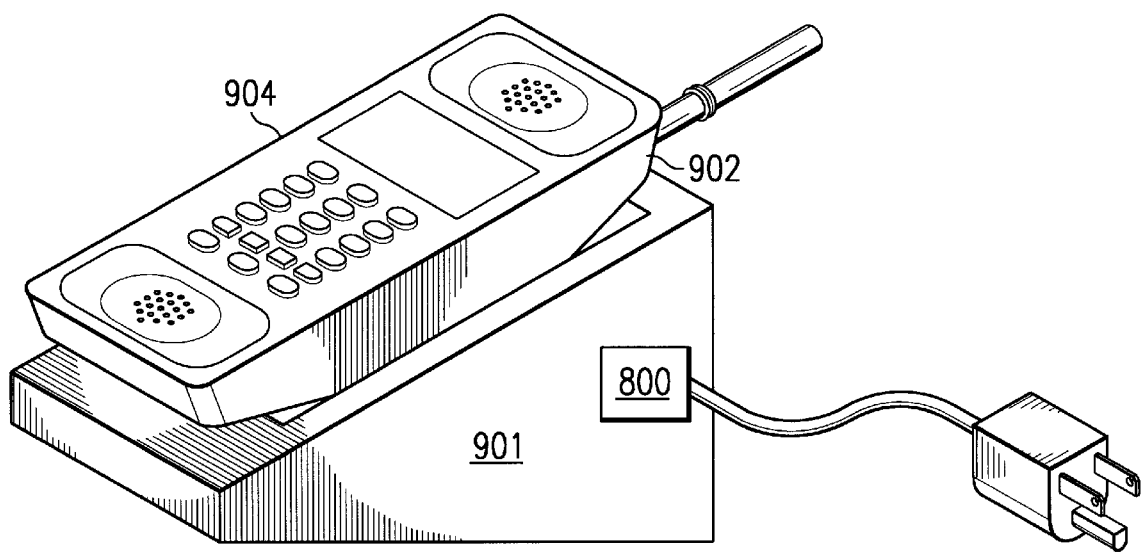
FIG. 5 schematically shows a sample battery charger which can be used to implement the method of FIG. 2

FIG. 5 shows a stand-alone battery charger 901, including a power converter 800, which is used to charge the detachable battery module 902 of a mobile telephone 904 which is placed in the rack of the charger 901. In this embodiment, the battery module 902 can be charged according to the method described above. In alternative embodiments, the innovative method can be used with other portable electronics.

According to a disclosed class of innovative embodiments, there is provided: A method for charging a battery in a technology where cell voltage remains substantially constant under current-limited conditions during charging from one-quarter capacity to one-half capacity, comprising the steps of: (a.) applying charging current to said battery under current-limited conditions, while allowing the battery voltage to stay at a first substantially fixed value which is determined by the chemistry of the battery, and not by external circuits; (b.) when the battery voltage begins to rise above said first fixed value, then clamping the voltage applied to said battery to a second fixed temperature-dependent value which is less than 120% of said first fixed value.

According to another disclosed class of innovative embodiments, there is provided: A method for charging a nickel metal hydride or analogous battery, comprising the steps of: (a.) applying charging current to said battery, while (b.) clamping the voltage applied to said battery to a temperature-dependent and current-dependent fixed value per cell, which is less than any voltage at which gassing can occur.

According to another disclosed class of innovative embodiments, there is provided: A computer system having a nickel metal hydride or analogous battery which is configured to be charged by applying charging current to said battery, while clamping the voltage applied to said battery to a temperature-dependent and current-dependent fixed value per cell, which is less than any voltage at which gassing can occur.

According to another disclosed class of innovative embodiments, there is provided: A battery which is connected and configured to be charged, during at least a portion of a respective charging period, by applying charging current to said battery under current-limited conditions, while allowing the battery voltage to stay at a first substantially fixed value which is determined by the chemistry of the battery, and not by external circuits, and when the battery voltage begins to rise above said first fixed value, clamping the voltage applied to said battery to a second fixed temperature-dependent value which is less than 120% of said first fixed value.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A method for charging a battery in a technology where cell voltage remains substantially constant under current-limited conditions during charging from one-quarter capacity to one-half capacity, comprising the steps of:

(a.) applying charging current to said battery under current-limited conditions, while allowing the battery voltage to stay at a first substantially fixed value which is determined by the chemistry of the battery, and not by external circuits;

(b.) when the battery voltage begins to rise above said first fixed value, then clamping the voltage applied to said battery to a second fixed temperature-dependent value which is less than 120% of said first fixed value.

2. The method of claim 1, wherein said technology is nickel metal hydride.

3. The method of claim 1, wherein said step (a.) applies a constant current to said battery.

4. The method of claim 1, wherein said step (a.) applies a constant power to said battery.

5. The method of claim 1, wherein the difference between said first and second values is in the range of 50–150 millivolts per cell.

6. A method for charging a nickel metal hydride or analogous battery, comprising the steps of:

(a.) applying charging current to said battery, while (b.) clamping the voltage applied to said battery to a temperature-dependent and current-dependent fixed value per cell, which is less than any voltage at which gassing can occur.

7. The method of claim 6, wherein said step (a.) applies a constant current to said battery.

8. The method of claim 6, wherein said step (a.) applies a constant power to said battery.

9. A computer system, comprising:

a user input device;

a microprocessor operatively connected to detect inputs from said input device;

memory which is connected to be read/write accessible by said microprocessor;

a video controller connected to said microprocessor;

a display operatively connected to display data generated by said video controller at a first refresh rate;

a power supply connected to provide power to said microprocessor, said memory, and said display;

an AC adaptor which has a connection to receive an AC power input from an external source, and which generates DC power from said AC power input; and a nickel metal hydride or analogous battery which is charged by applying charging current to said battery, while clamping the voltage applied to said battery to a temperature-dependent and current-dependent fixed value per cell, which is less than any voltage at which gassing can occur.

10. The computer system of claim 9, wherein said battery is charged at a constant current.

11. The computer system of claim 9, wherein said user input device is a keyboard.

12. A battery which is connected to a charger which charges said battery, during at least a portion of a respective charging period, by applying charging current to said battery under current-limited conditions, while allowing the battery voltage to stay at a first substantially fixed value which is determined by the chemistry of the battery, and not by external circuits, and when the battery voltage begins to rise above said first fixed value, clamping the voltage applied to ;aid battery to a second fixed temperature-dependent value which is less than 120% of said first fixed value.

13. The battery of claim 12, wherein said battery is a nickel metal hydride battery.

14. A portable electronic system, comprising:

electronic operating circuits which perform one or more functions;

an AC adaptor which has a connection to receive an AC power input from an external source, and which generates DC power from said AC power input; and a battery pack;

charging circuitry connected to charge said battery pack, during at least a portion of a respective charging period, by applying charging current to said battery under current-limited conditions, while allowing the battery voltage to stay at a first substantially fixed value which is determined by the chemistry of the battery, and not by external circuits, and when the battery voltage begins to rise above said first fixed value, clamping the voltage applied to said battery to a second fixed temperature-dependent value which is less than 120% of said first fixed value.

15. The portable electronic system of claim 14, wherein said battery pack comprises nickel metal hydride batteries.

16. The portable electronic system of claim 14, wherein said electronic operating circuits comprise a microprocessor and a memory.

17. The portable electronic system of claim 14, wherein said electronic operating circuits comprise a microprocessor and a memory.

18. The portable electronic system of claim 14, wherein said current-limited conditions comprise a constant current.

* * * * *